(12) United States Patent
Vasileiou et al.

(10) Patent No.: US 11,434,381 B2
(45) Date of Patent: Sep. 6, 2022

(54) COATING

(71) Applicant: BIC VIOLEX S.A., Anixi (GR)

(72) Inventors: Gerasimos Vasileiou, Athens (GR);
Georgios Vlachos, Attica (GR);
Vasileios Papachristos, Athens (GR);
John Parthenios, Achaia (GR);
Konstantinos Papagelis, Kamatero Athens (GR)

(73) Assignee: BIC-VIOLEX SA, Anixi (GR)

( * ) Notice: Subject to any disclaimer, the term of this patent is extended or adjusted under 35 U.S.C. 154(b) by 53 days.

(21) Appl. No.: 15/450,506

(22) Filed: Mar. 6, 2017

(65) Prior Publication Data
US 2018/0251641 A1 Sep. 6, 2018

(51) Int. Cl.
| | |
|---|---|
| C09D 7/40 | (2018.01) |
| C09D 127/18 | (2006.01) |
| B26B 21/60 | (2006.01) |
| B05D 1/02 | (2006.01) |
| B05D 3/02 | (2006.01) |
| C09D 7/61 | (2018.01) |

(Continued)

(52) U.S. Cl.
CPC ............... C09D 7/70 (2018.01); B05D 1/02 (2013.01); B05D 3/0254 (2013.01); B05D 5/083 (2013.01); B05D 7/14 (2013.01); B26B 21/60 (2013.01); C09D 7/61 (2018.01); C09D 7/67 (2018.01); C09D 7/68 (2018.01); C09D 127/18 (2013.01); B05D 2202/15 (2013.01); B05D 2601/20 (2013.01); C08K 3/04 (2013.01); C08K 3/041 (2017.05); C08K 3/042 (2017.05); C08K 3/046 (2017.05); C08K 2003/3009 (2013.01)

(58) Field of Classification Search
CPC combination set(s) only.
See application file for complete search history.

(56) References Cited

U.S. PATENT DOCUMENTS 3,713,873 A * 1/1973 Fish ............ B05B 5/08
118/627
7,842,432 B2 11/2010 Niu et al.
(Continued)

FOREIGN PATENT DOCUMENTS

| CN | 103740192 B | * | 2/2016 |
| WO | WO 2015/137913 A1 | | 9/2015 |
| WO | WO 2016/049477 A1 | | 3/2016 |

OTHER PUBLICATIONS

Suh et al, Mechanical properties of polytetrafluoroethylene composites reinforced with graphene nanoplatelets by solid-state processing, composites part B, 95, Apr. 4, 2016, pp. 317-323 (Year: 2016).*

(Continued)

*Primary Examiner* — Stefanie J Cohen
(74) *Attorney, Agent, or Firm* — Polsinelli PC

(57) ABSTRACT

A coating including one or more nano-materials and an organic material; wherein the one or more nano-materials are present in a concentration of up to about 30% by weight, based on the total weight of the coating. A razor comprising one or more blades; and a coating disposed on at least one of the one or more blades, wherein the coating comprises one or more nano-materials and an organic material, wherein the one or more nano-materials is present in a concentration of up to about 30% by weight, based on the total weight of the coating.

6 Claims, 2 Drawing Sheets

(51) Int. Cl.
   *B05D 5/08*     (2006.01)
   *B05D 7/14*     (2006.01)
   *C08K 3/04*     (2006.01)
   *C08K 3/30*     (2006.01)

(56) References Cited

U.S. PATENT DOCUMENTS

| | | | |
|---|---|---|---|
| 8,114,375 | B2 | 2/2012 | Jang et al. |
| 8,216,541 | B2 | 7/2012 | Jang et al. |
| 8,501,318 | B2 | 8/2013 | Jang et al. |
| 8,652,687 | B2 | 2/2014 | Zhamu et al. |
| 8,709,953 | B2 | 4/2014 | Lill et al. |
| 8,808,580 | B2 | 8/2014 | Plee et al. |
| 8,900,663 | B2 | 12/2014 | Handy et al. |
| 8,972,472 | B2 | 3/2015 | Kanter et al. |
| 8,981,357 | B2 | 3/2015 | Yoon et al. |
| 9,067,811 | B1 | 6/2015 | Bennett et al. |
| 9,120,676 | B2 | 9/2015 | Miller |
| 9,146,511 | B2 | 9/2015 | Qi et al. |
| 9,309,382 | B2 | 4/2016 | Wu et al. |
| 9,376,412 | B2 | 6/2016 | Tsai et al. |
| 9,434,664 | B2 | 9/2016 | Baek et al. |
| 9,458,325 | B2 | 10/2016 | Zhang et al. |
| 9,529,312 | B2 | 12/2016 | Qi et al. |
| 9,541,873 | B2 | 1/2017 | Zhang et al. |
| 9,568,181 | B2 | 2/2017 | Boomgaarden et al. |
| 2009/0092747 | A1* | 4/2009 | Zhamu ............ H01G 11/38 427/80 |
| 2009/0155479 | A1* | 6/2009 | Xiao ............... C23C 4/06 427/451 |
| 2011/0269919 | A1 | 11/2011 | Min et al. |
| 2013/0251943 | A1 | 9/2013 | Pel et al. |
| 2014/0060843 | A1 | 3/2014 | Murphy et al. |
| 2014/0065368 | A1 | 3/2014 | Aytug et al. |
| 2014/0154512 | A1 | 6/2014 | Dooley et al. |
| 2014/0227548 | A1* | 8/2014 | Myrick ............ C10L 1/28 428/570 |
| 2014/0357800 | A1 | 12/2014 | Backer et al. |
| 2014/0377160 | A1 | 12/2014 | Mukasyan et al. |
| 2015/0118430 | A1 | 4/2015 | Korzhenko et al. |
| 2015/0147506 | A1 | 5/2015 | Korzhenko et al. |
| 2015/0159967 | A1 | 6/2015 | Furumura et al. |
| 2015/0162168 | A1 | 6/2015 | Oehrlein et al. |
| 2015/0372350 | A1 | 12/2015 | Solomon et al. |
| 2016/0019996 | A1 | 1/2016 | Ghosh et al. |
| 2016/0151753 | A1 | 6/2016 | Swager et al. |
| 2016/0190606 | A1 | 6/2016 | Kim et al. |
| 2016/0222751 | A1 | 8/2016 | Bullock et al. |
| 2016/0237754 | A1 | 8/2016 | Sui |
| 2016/0261005 | A1 | 9/2016 | Rustomji et al. |
| 2017/0129117 | A1* | 5/2017 | Marchev ............ B26B 21/58 |

OTHER PUBLICATIONS

Rooyen et al, Preparation of PTFE/graphene nanocomposites by compression moulding and free sintering: A guideline, j. appl. poly. sci (Year: 2016).*

CN-103740192-B—English translation (Year: 2016).*

* cited by examiner

COATING

BACKGROUND

1. Field

The following description relates to coatings applied to the blade of a shaving razor. The coating includes an organic material reinforced by one or more nano-materials.

2. Description of Related Art

Conventional coatings applied to the blade of shaving razors include polytetrafluoroethylene (PTFE) as a lubricating component. The dispersions having PTFE can be applied and sintered onto shaving blades. The coating, provides lubrication and reduces the friction between the blade and the hair and skin from that of an uncoated blade surface. However, the present PTFE coatings still produce more friction between the blade, hair, and skin than desired. Further, several disadvantages are typically encountered including insufficient lubrication of razor blades, leading to poor shaving performance.

SUMMARY

The present description provides a nanocomposite coating, comprising nano-materials and organic solids, that overcomes the aforementioned disadvantages of conventional shaving blade coatings. The nanocomposite coating generally includes a nano-material mixture; the nano-material mixture as described herein may be a dispersion of one or more nano-materials throughout a suitable medium in order to create a dispersion that may be used to form a lubricating coating on a desired surface. The one or more nano-materials may be, but are not limited to, carbon-based nano-materials (including, but not limited to, graphene nano-platelets, graphite nano-platelets, oxidized graphene nano-platelets, oxidized graphite nano-platelets, large area graphene sheets, and carbon nanotubes (CNTs)), thick and thin two-dimensional materials (including, but not limited to, graphene, boron nitride (BN), tungsten (IV) sulfide ($WS_2$), and molybdenum disulfide ($MoS_2$)), van der Waals heterostructures (such as layer-by-layer stacks of two-dimensional materials), suitable hybrid compounds (such as a mixture of suitable combinations of carbon-based nano-materials and other two-dimensional materials), and any other suitable nano-material. The surface on which the final solution/mixture is applied may be, but is not limited to, a blade edge (such as a stainless steel strip having at least one cutting edge and a hard coating). A solution/mixture made in accordance with the disclosure herein may also include an organic material, such as polyfluorocarbon (including, but not limited to, PTFE nanoparticles). The solution/mixture may be prepared, diluted, applied, and sintered onto the desired surface. The nanocomposite coating may act, but is not bound, as a lubricating (or soft) coating for a blade.

An aspect of the present disclosure may be achieved by providing a nanocomposite coating having one or more nano-materials and an organic material. The one or more nano-materials may be selected from the group consisting of carbon-based nano-materials, two-dimensional materials, van der Waals heterostructures, hybrid compounds, and combinations thereof. The carbon-based nano-materials may be selected from the group consisting of graphene nano-platelets, graphite nano-platelets, oxidized graphene nano-platelets, oxidized graphite nano-platelets, large area graphene sheets, carbon nanotubes (CNTs) and combinations thereof. The two-dimensional materials may be selected from the group consisting of graphene, boron nitride (BN), tungsten (IV) sulfide ($WS_2$), and molybdenum disulfide ($MoS_2$). The organic material may be a polyfluorocarbon. The polyfluorocarbon may be polytetrafluoroethylene (PTFE). The one or more nano-materials may be present in a concentration of up to about 30% by weight, based on a total weight of the nanocomposite coating.

Another aspect of the present disclosure may be achieved by providing a razor having one or more blades and a coating disposed on at least one of the one or more blades. The coating may include one or more nano-materials selected from the group consisting of carbon-based nano-materials, two-dimensional materials, van der Waals heterostructures, hybrid compounds, and combinations thereof; and an organic material. The one or more nano-materials may be present in a concentration of up to about 30% by weight, based on the total weight of the coating. The blade may be a strip of stainless steel, having at least one cutting edge.

In yet another aspect, the present disclosure may be achieved by providing a method for coating a surface including mixing one or more nano-materials and a suitable medium with an organic material to achieve a dispersion, diluting the dispersion with a suitable diluent, depositing the diluted solution onto a surface, and sintering the surface after the diluted solution is disposed onto the surface. The dispersion may have a nano-material concentration from about 0% to about 10% by weight and an organic material concentration of about 20% by weight, based on the total weight of the dispersion. The diluted solution may have a nano-material concentration of about 0% to about 0.6% by weight and an organic material concentration of less than about 2% by weight, based on the total weight of the diluted solution. The surface may be a blade, having a hard coating.

The foregoing is intended to be illustrative and is not meant in a limiting sense. Many features of the embodiments may be employed with or without reference to other features of any of the embodiments. Additional aspects, advantages, and/or utilities of the present inventive concept will be set forth, in part, in the description that follows and, in part, will be apparent from the description, or may be learned by practice of the present inventive concept.

BRIEF DESCRIPTION OF THE DRAWINGS

The foregoing summary, as well as the following detailed description, will be better understood when read in conjunction with the appended drawings. For the purpose of illustration, there are shown in the drawings certain embodiments of the present disclosure. It should be understood, however, that the present inventive concept is not limited to the precise embodiments and features shown. The accompanying drawings, which are incorporated in and constitute a part of this specification, illustrate an implementation of compositions consistent with the present inventive concept and, together with the description, serve to explain advantages and principles consistent with the present inventive concept.

DETAILED DESCRIPTION

Figure 1:
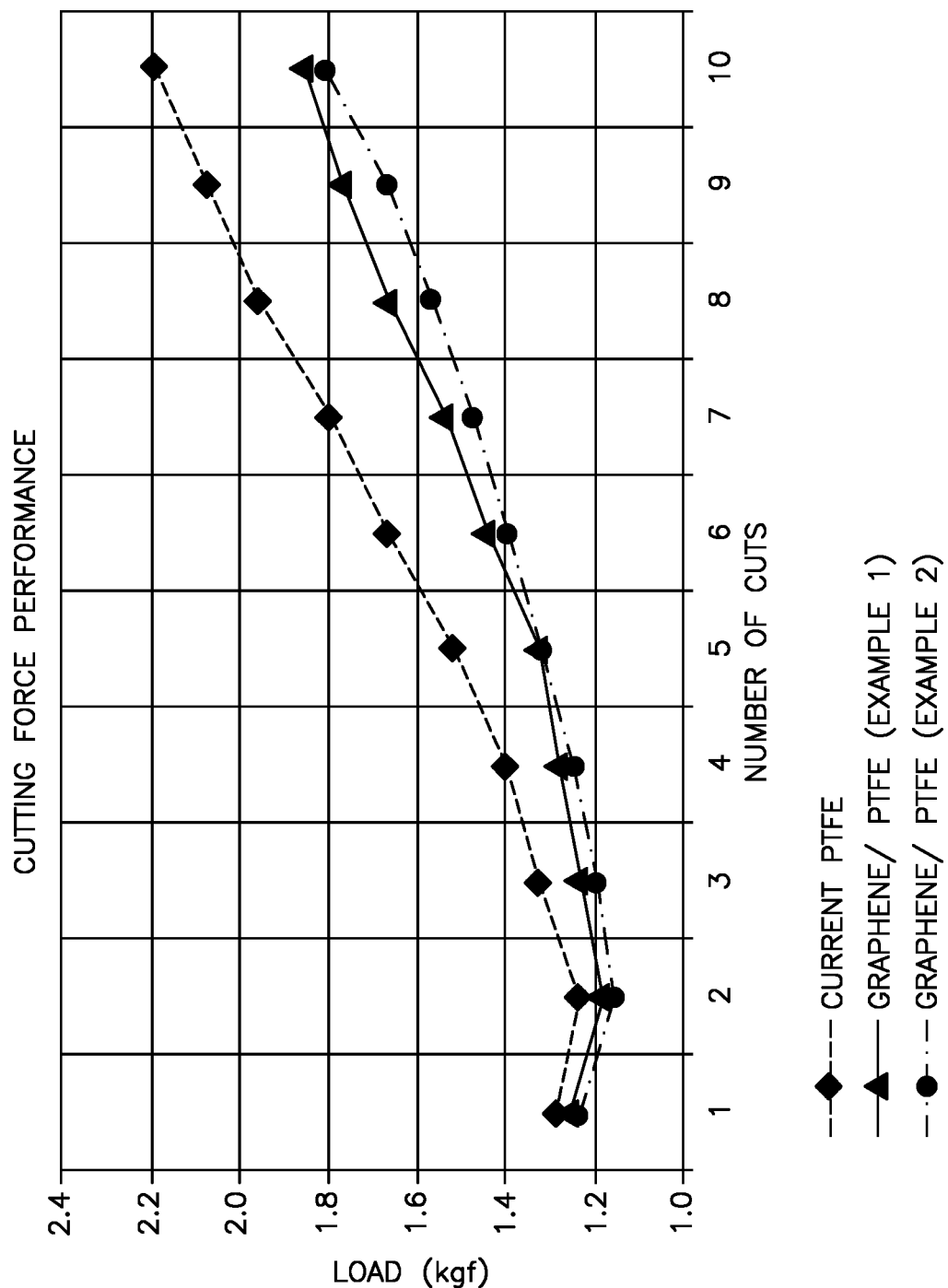
FIG. 1 is a graph illustrating a comparison of cutting force performance.

It is to be understood that the present disclosure is not limited in its application to the details of construction and to the embodiments of the components set forth in the following description or illustrated in the drawings. The figures and written description are provided to teach any person skilled in the art to make and use the inventions for which patent protection is sought. The present inventive concept is capable of other embodiments and of being practiced and carried out in various ways. Persons of skill in the art will appreciate that the development of an actual commercial embodiment incorporating aspects of the present inventive concept will require numerous implementations—specific decisions to achieve the ultimate goal of the developer for the commercial embodiment. While these efforts may be complex and time-consuming, these efforts, nevertheless, would be a routine undertaking for those of skill in the art of having the benefit of this disclosure.

I. Terminology

The phraseology and terminology employed herein are for the purpose of description and should not be regarded as limiting. For example, the use of a singular term, such as, "a" is not intended as limiting of the number of items. Further, it should be understood that any one of the features of the present inventive concept may be used separately or in combination with other features. Other systems, methods, features, and advantages of the present inventive concept will be, or become, apparent to one having skill in the art upon examination of the figures and the detailed description. It is intended that all such additional systems, methods, features, and advantages be included within this description, be within the scope of the present inventive concept, and be protected by the accompanying claims.

Further, any term of degree such as, but not limited to, "about" or "approximately," as used in the description and the appended claims, should be understood to include the recited values or a value that is three times greater or one third of the recited values. For example, about 3 mm includes all values from 1 mm to 9 mm, and approximately 50 degrees includes all values from 16.6 degrees to 150 degrees.

The term "graphene nano-platelets" as used herein is defined as including both single layer and multi-layer (such as, few layer) planar sheets interacting by van der Waals forces with an average thickness of up to about 10 nm and a lateral size of up to about 100 µm. The term "graphite nano-platelets" as used herein is defined as including crystals with a thickness of greater than about 10 nm. As used herein, the phrase "large area graphene sheets" is defined as the material grown on thin metallic substrates under a chemical vapor deposition process; providing a surface area of greater than about 5 cm$^2$. Additionally, the terms "oxidized graphene" and "oxidized graphite" refer to "graphene oxide nano-platelets" and "graphite oxide nano-platelets", respectively.

The term "carbon nanotubes" (CNTs) as used herein is defined as one-dimensional cylindrical nano-structures consisting of either single walled graphene tubes having a diameter of less than about 2 nm, or multiple concentric graphene tubes (also referred to herein as "multi-walled") having diameters of about 100 nm. The length of both the single and multi-walled CNTs may be less than about 100 µm.

The term "thin 2-D materials" as used herein is defined as including both single layer and multi-layered (such as, few layered) planar sheets interacting by van der Waals forces, wherein the sheets have an average thickness of up to about 10 nm and a lateral size of up to about 5 µm. Correspondingly, crystals having a thickness of greater than about 10 nm are referred to herein as "thick 2-D materials". The term "van der Waals heterostructures" as used herein is defined as the layer-by-layer stacking of different 2-D materials.

The term "hybrid compounds" as used herein is defined as materials made by mixing suitable combinations of graphene nano-platelets, graphite nano-platelets, and CNTs with other 2-D materials.

The term "organic material" as used herein may include a lubricating material, such as a hydrophobic or hydrophilic lubricating material.

The term "suitable medium" as used herein may include, but is not limited to, a pure organic solvent, a pure inorganic solvent, a surface active agent or any combination thereof.

The term "nanocomposite coating" as used herein refers to a sintered coating comprising a combination of at least one nano-material and an organic material.

The term "nano-material" as used herein may refer to carbon based nano-materials, thin two-dimensional materials, thick two-dimensional materials, van der Waals heterostructures, and hybrid compounds.

The term "carbon based nano-material" as used herein may refer to, but is not limited to, graphene nano-platelets, graphite nano-platelets, large area graphene sheets, graphene oxide nano-platelets, graphite oxide nano-platelets, carbon nanotubes (CNTs). Further, as the present inventive concept is susceptible to embodiments of many different forms, it is intended that the present disclosure be considered as an example of the principles of the present inventive concept and not intended to limit the present inventive concept to the specific embodiments shown and described. Any one of the features of the present inventive concept may be used separately or in combination with any other feature. References to the terms "embodiment," "embodiments," and/or the like in the description mean that the feature and/or features being referred to are included in, at least, one aspect of the description. Separate references to the terms "embodiment," "embodiments," and/or the like in the description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the present inventive concept may include a variety of combinations and/or integrations of the embodiments described herein. Additionally, all aspects of the present disclosure, as described herein, are not essential for its practice. Likewise, other systems, methods, features, and advantages of the present inventive concept will be, or become, apparent to one having skill in the art upon examination of the figures and the description. It is intended that all such additional systems, methods, features, and advantages be included within this description, be within the scope of the present inventive concept, and be encompassed by the claims.

Lastly, the terms "or" and "and/or," as used herein, are to be interpreted as inclusive or meaning any one or any combination. Therefore, "A, B or C" or "A, B and/or C" mean any of the following: "A," "B," "C"; "A and B"; "A and C"; "B and C"; "A, B and C." An exception to this definition will occur only when a combination of elements, functions, steps or acts are in some way inherently mutually exclusive.

II. Nano-Material Mixture

The nano-material mixture as described herein may be a dispersion of one or more nano-materials throughout a suitable medium. The one or more nano-materials may be, but are not limited to, carbon-based nano-materials (including, but not limited to, graphene nano-platelets, graphite nano-platelets, oxidized graphene nano-platelets, oxidized graphite nano-platelets, large area graphene sheets, and carbon nanotubes (CNTs)), thick and thin two-dimensional materials (including, but not limited to, graphene, boron nitride (BN), tungsten (IV) sulfide ($WS_2$), and molybdenum disulfide ($MoS_2$)), suitable hybrid compounds (including, but not limited to, materials made by mixing suitable combinations of graphene/graphite nano-platelets, CNTs with other 2-D materials), and van der Waals heterostructures (including, but not limited to, layer-by-layer stacks of different 2-D materials, such as graphene with boron nitride (BN), tungsten (IV) sulfide ($WS_2$), molybdenum disulfide ($MoS_2$)), and other suitable nano-materials. While the nano-materials generally described herein are referred to as powders, it would be understood by those having skill in the art that the previously described materials may be included in powder form or dispersed within a suitable medium (including, but not limited to, water, an ethanol and water mixture, or any other suitable organic solvents). Graphene nano-platelets and graphite nano-platelets powders compatible for use in the present nanocomposite coating may include those which are commercially available in a variety of sizes and thicknesses. For example, the graphene nano-platelets compatible for use with the coatings described herein may have a lateral size of from about 0.25 μm to about 100 μm and a thickness of from about 0.34 nm (such as a single layer) up to about 10 nm (such as multi-layered nano-platelets). Additionally, the graphite nano-platelets compatible for use with the coatings described herein may have a nano-platelet lateral size of from about 0.25 μm to about 100 μm and a nano-platelet thickness of less than about 10 nm. The nano-materials may be dispersed throughout a suitable medium. In at least one example, the suitable medium may be water, such as deionized water. The concentration of the nano-material/aqueous mixture may be from about 0 grams per milliliter (gr/mL) to about 5 gr/mL by weight nano-material, based on a total weight of the nano-material/aqueous mixture.

A second mixture may be added to the above described nano-material/aqueous mixture. The second mixture (also referred to herein as an "organic material dispersion") may be a dispersion of an organic material throughout a suitable medium. In at least one embodiment, the organic material may be a polyfluorocarbon, including, but not limited to, polytetrafluoroethylene (PTFE) is dispersed within de-ionized $H_2O$ and surfactant, having a PTFE solids concentration of about 20% by weight, based on the total weight of the second mixture (also referred to herein as a "RIFE dispersion"). Suitable PTFE dispersions are commercially available from companies, including, but not limited to, the Chemours Company (such as the LW2120 dispersion).

In at least one embodiment, to create the initial organic material/nano-material mixture, the nano-material/aqueous mixture is added to the organic material dispersion using methods including, but not limited to, magnetic stirring and tip sonication techniques. The resulting organic material/nano-material mixture (also referred to herein as the "initial mixture") may be created in a wide variety of concentrations including, but not limited to, from about 0% to about 10% gr/mL nano-material and about 20% by weight organic material, based on the total weight of the initial organic material/nano-material mixture. The dispersion may be loaded into a roll mixer, or other suitable mixing device, to obtain a dispersion of the nano-materials throughout the aqueous-based organic material mixture. A second mixing step may help to prevent the agglomeration of nano-materials within the dispersion. Once a suitable dispersion is achieved, the initial mixture may be diluted using de-ionized water, or any other suitable diluent, to achieve the desired concentration for the final organic material/nano-material mixture. For example, the final concentration of the diluted dispersion may be, but is not limited to, from about 0.0% to about 0.6% by weight nano-materials and less than about 2% by weight organic material, based on the total weight of the final organic material/nano-material mixture.

In an alternative example, the initial organic material/nano-material mixture may be more structured. For example, the nano-material may be, but is not limited to, sheets of aligned graphene, providing a reinforcement material for the final coating. The nano-composite coating may then include stacks, or layers, of the aligned graphene sheets and organic matrix material.

In another alternative example, the nano-composite coating may include a combination of the unstructured and structured examples described above.

III. Application of the Final Organic Material/Nano-Material Mixture

The diluted dispersion may be applied to any desired surface using one of many different methods including, but not limited to, spraying, dipping, lamination, and any other suitable coating technique. The desired surface may include, but is not limited to, a plurality of razor blades, and individual stainless steel strips having a cutting edge. For example, spraying of the final mixture may be completed by, but not limited to, airless, air-assisted, air spray, or various other spraying methods.

For example, the final mixture may be disposed on the desired surface using a coating system. The coating system may include a tank, holding the final organic material/nano-material mixture, and a stirrer, to keep the mixture under constant motion to maintain a homogenous dispersion. The tank may be connected to an air supply and a pump via a pipe, to create pressurization within the tank and allow for a pressurized flow of the mixture out of a spray gun in fluidic communication with the tank. The spray gun may be, but is not limited to, a low pressure spray gun, and may use air pressure and fluid pressure to achieve the desired atomization of the final mixture. The spray gun may be configured to produce a mist of fine particles of the final mixture to be disposed on the desired surface; the size and reparation of the particles may be adjusted by using different air-caps on the end of the spray gun. For example, the coating may be applied to a surface in accordance with methods as described in WO 2011047727, included herein by reference in its entirety.

After the coating has been applied to a substrate, or desired surface, the coating may be sintered. Sintering may be completed through the use of, but is not limited to, resistance, ultraviolet (UV) light, infrared (IR) light, flash lamps, and any other suitable sintering processes. The sintering process may be completed, for example, by heating the coated surface at a temperature of 360° C. until the organic material is melted, leaving only the desired nano-composite coating, comprising only the nano-materials and the organic material solids, disposed on the surface. The nanocomposite coating may have a nano-material concentration of from about 0% to about 30% by weight, based on a total weight of the nanocomposite coating.

IV. Analysis of the Coating

The sintered nanocomposite coating may be analyzed using a variety of different methods to determine specific characteristics of the coating. For example, morphological characteristics may be evaluated using optical microscopy (OM) and scanning electron microscopy (SEM). Additionally, the frictional characteristics of the sintered coating may be evaluated using a friction test. The friction test may measure resistance to dragging, the force developed when a coated surface is dragged over a specified material (such as a specific type of paper for a predetermined distance). In the alternative, frictional characteristics may be measured using a dry and/or wet felt test. For example, when the coating is applied to a blade edge, the test may include a determination of the cutting force developed on the blade during a series of continuous cuts on a moving dry or wet felt. Finally, a Thermogravimetric analysis (TGA) was used, Q50 TA Insts®, in order to quantify the concentration of the nano-material into the nanocomposite coating.

An in-depth analysis of coating may also be performed using Differential Scanning calorimetry (DSC), Raman microscopy, and Atomic Force microscopy (AFM). Several examples of the sintered nanocomposite coating were analyzed based on the above methods. For example, Differential Scanning calorimetry thermograms were obtained using Differential Scanning calorimetry on a Q100 TA Insts® to identify variations in the melting and crystallization behavior of organic material in the presence of nano-material. Raman microscopy was performed using a Renishaw® Invia 2000 at 785 nm to identify the quality of the nano-material used, the organic material/nano-material interactions, and, where possible, were used to define the thickness of the nano-material inclusions. Additionally, Raman microscopy was used to detect possible structure changes on organic materials after the incorporation of the nano-material. Finally, Atomic Force microscopy performed on a Bruker® FastScan was used to perform topographic analysis of the coating after deposition on the blades.

V. Examples

The following examples are provided to illustrate the subject matter of the present disclosure. The examples are not intended to limit the scope of the present disclosure and should not be so interpreted.

Example 1

3.5 grams of graphene nano-platelets powder, having a graphene nano-platelet diameter of about 5 μm and a thickness of about 10 layers, are dispersed in a suitable medium (in this example de-ionized $H_2O$ was used). The graphene nano-platelets dispersion was then mixed with 350 mL of a LW2120 dispersion; the LW2120 dispersion having a PTFE solids concentration of 20% by weight, based on the total weight of the dispersion. Then, the mixture was stirred for five minutes using magnetic stirring and an additional five minutes using tip sonication. The mixture was then loaded into a roll mixer and stirred for ten minutes to prevent agglomeration of the nano-platelets. The initial PTFE/graphene nano-platelets mixture had a concentration of about 1% gram/mL of graphene nano-platelets and about 20% by weight PTFE, based on a total weight of the initial PTFE/graphene nano-platelets mixture. The initial mixture was then diluted to a lower concentration using de-ionized water. The concentration of the diluted mixture was determined to be about 0.06% by weight graphene nano-platelets and about 1.2% by weight PTFE, based on a total weight of the final PTFE/graphene nano-platelets mixture.

The final PTFE/graphene nano-platelets dispersion was then sprayed onto a razor blade surface using a commercially available production spray system. For the purposes of this example, the razor blade was an individual strip of stainless steel having a cutting edge with a specific grinding profile, wherein the blade is covered in a hard coating material. The spray system includes, as described above, a pressurized tank having a stirrer in order to maintain homogenous dispersion of the particles throughout the final mixture. The tank is in fluidic communication with a spray gun having a nozzle that allows for a pressurized mist of the final mixture to be disposed on the blade to a desired thickness. The coated blade was then sintered in a resistance heating oven by heating the blades at 360° C. to melt the PTFE nano-particles and leave the desired nanocomposite coating on the blades. Once sintered, the coated blades were left with a 4.76% by weight graphene nano-platelets, based on the total weight of the graphene nano-platelets/PTFE nanocomposite coating.

Example 2

0.875 grams of graphene nano-platelets powder, having a nano-platelet lateral size of up to about 3 μm and a thickness of up to about 14 layers, dispersed within a suitable medium. The graphene nano-platelets dispersion was then mixed with 350 mL of a LW2120 dispersion; the LW2120 dispersion having a PTFE solids concentration of 20% by weight, based on total weight of the dispersion. Then, the mixture was stirred for five minutes using magnetic stirring and an additional five minutes using tip sonication. The mixture was then loaded into a roll mixer and stirred for ten minutes to prevent agglomeration of the nano-platelets. The initial PTFE/graphene nano-platelets mixture had a concentration of about 0.25% gram/mL of graphene nano-platelets and about 20% by weight PTFE, based on a total weight of the initial mixture. Next, the initial mixture was diluted to a lower concentration using de-ionized water. The concentration of the final PTFE/graphene nano-platelets mixture was about 0.015% gram/mL graphene nano-platelets and about 1.2% by weight PTFE, based on a total weight of the final mixture.

The final PTFE/graphene nano-platelets mixture was then sprayed onto a razor blade surface using a commercially available production spray system. For the purposes of this example, the razor blade was an individual strip of stainless steel having a cutting edge with a specific grinding profile, wherein the blade is covered in a hard coating material. The spray system includes, as described above, a pressurized tank having a stirrer in order to maintain homogenous dispersion of the particles throughout the final mixture. The tank is in fluidic communication with a spray gun having a nozzle that allows for a pressurized mist of the final mixture to be disposed on the blade to a desired thickness. The coated blade was then sintered in a resistance heating oven by heating the coated blade to 360° C. to melt the PTFE nano-particles and leave the blade coated with the desired nanocomposite. Once sintered, the coated blades are left with a 1.23% by weight graphene nano-platelets, based on the total weight of the graphene nano-platelets/PTFE nanocomposite coating.

While the above Examples generally include carbon-based graphene nano-platelets in powder form, it would be obvious to those having skill in the art that similar coatings could be made using other nano-materials as discussed above, including, but not limited to, graphite nano-platelets, oxidized graphene nano-platelets, oxidized graphite nanoplatelets, large area graphene sheets, CNTs, thick and thin two-dimensional materials (including, but not limited to, graphene, boron nitride (BN), tungsten (IV) sulfide ($WS_2$), and molybdenum disulfide ($MoS_2$)), suitable hybrid compounds (materials made by mixing suitable combinations of graphene/graphite nano-platelets, CNTs with other 2-D materials), as well as van der Waals heterostructures (including layer-by-layer stacks of different 2-D materials, such as graphene with boron nitride (BN), tungsten (IV) sulfide ($WS_2$), and molybdenum disulfide ($MoS_2$)), hybrid compounds, and other suitable nano-materials.

VI. Evaluation

Testing as described above was performed on three samples, a PTFE only coating, the graphene nano-platelets/PTFE nanocomposite coating as described in Example 1, and the graphene nano-platelets/PTFE nanocomposite coating as described in Example 2.

FIG. 1 illustrates the cutting force performance of each of the three different samples. The value of the first cut loads of Examples 1 and 2 is measured to be about 4-5% lower than the blade produced using the standard PTFE coating. Additionally, the tenth cut loads delivered by the blades coated with the Example 1 and 2 coatings were about 15-17% lower than the corresponding load values of the standard PTFE coated blade. Specifically, the values of cut force for the first and tenth cut are shown in Table 1, below.

TABLE 1

| Sample | Force at $1^{st}$ Cut (Kgf) | Force at $10^{th}$ Cut (Kgf) |
|---|---|---|
| Standard PTFE Coating | 1.291 | 2.194 |
| Example 1 Coating | 1.226 | 1.858 |
| Example 2 Coating | 1.241 | 1.811 |

Figure 2:
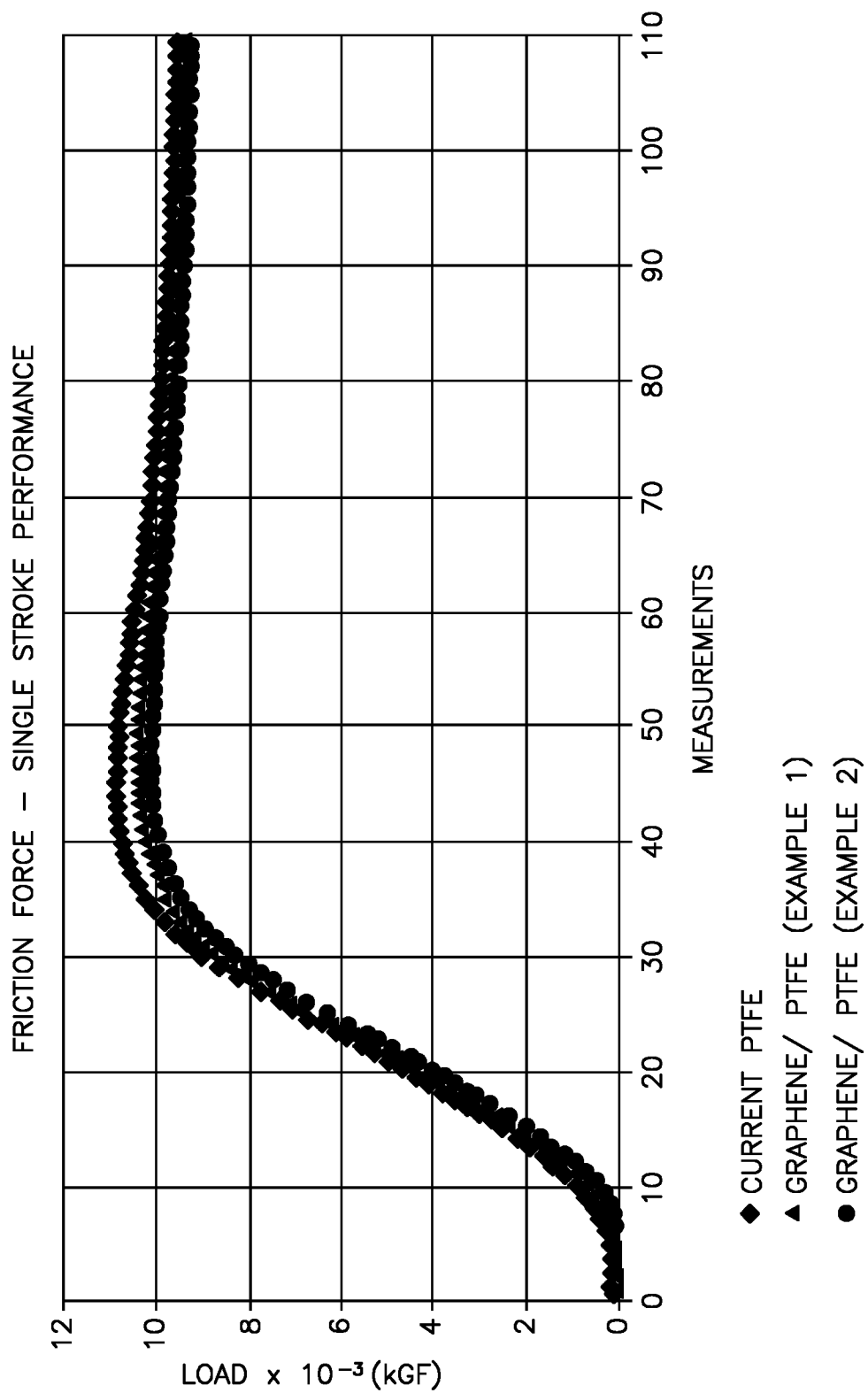
FIG. 2 is a graph illustrating a comparison of friction force.

FIG. 2 illustrates the results of the friction force performance tests. As shown, the coatings as prepared by Examples 1 and 2 provide about a 5-7% decrease of the MAX load developed during the friction test single stroke measurement compared to the standard PTFE coated blade. Specifically, the MAX value of friction force for each coated blade is shown in Table 2, below.

TABLE 2

| Sample | MAX Value of Friction Force × $10^{-3}$ (Kgf) |
|---|---|
| Standard PTFE Coating | 10.9 |
| Example 1 Coating | 10.4 |
| Example 2 Coating | 10.1 |

Additional SEM analysis of the blades treated with the coating produced in Examples 1 and 2 showed gradual exfoliation of graphene nano-platelets in the form of layers and preservation of the structural integrity of the layers into the PTFE matrix. The coatings produced in accordance with the present disclosure showed superior lubrication and superior shaving performance in comparison with the standard PTFE coated blade.

While the embodiments have been described in detail in the foregoing description, the same is to be considered as illustrative and not restrictive in character, it being understood that only some embodiments have been shown and described and that all changes and modifications that come within the spirit of the embodiments are desired to be protected. While said particular embodiments of the present disclosure have been described, it would be obvious to those skilled in the art that various other changes and modifications may be made without departing from the spirit and scope of the disclosure. It is therefore intended to cover in the appended claims all such changes and modifications are within the scope of the disclosure.

What is claimed is:

1. A razor comprising:
one or more blades; and
a sintered coating disposed on at least one of the one or more blades, wherein the sintered coating consists of a single layer of carbon-based nano-materials and an organic material, wherein the carbon-based nano-materials are graphene nanoplatelets and are present in a concentration of greater than about 0% to about 30% by weight, based on the total weight of the coating;
wherein the sintered coating is derived from an aqueous dispersion of the carbon-based nano-materials and the organic material;
wherein the coating is sintered by heating the carbon-based nano-materials and an organic material at a temperature above the melting point of the organic material while no pressure is applied.

2. The razor of claim 1, wherein the organic material of the coating is a polyfluorocarbon.

3. The razor of claim 2, wherein the polyfluorocarbon is PTFE.

4. The razor of claim 1, wherein the one or more blades are a strip of stainless steel, wherein the stainless-steel strip has at least one cutting edge.

5. The razor of claim 1, wherein the carbon-based nano-materials are present in an amount of less than about 5% by weight, based on the total weight of the coating.

6. The razor of claim 1, wherein the coating is a hard coating.

* * * * *